(12) United States Patent
Santomo et al.

(10) Patent No.: US 10,461,603 B2
(45) Date of Patent: Oct. 29, 2019

(54) FAN MOTOR SUPPORT

(71) Applicant: Valeo Systemes Thermiques, Le Mesnil Saint Denis (FR)

(72) Inventors: Renato Santomo, Sao Paulo (BR); Arnaldo Vicentine, Sao Paulo (BR); Daniel Antoniazzi, Sao Paulo (BR)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 294 days.

(21) Appl. No.: 15/302,531

(22) PCT Filed: Mar. 20, 2015

(86) PCT No.: PCT/EP2015/056009
§ 371 (c)(1),
(2) Date: Oct. 7, 2016

(87) PCT Pub. No.: WO2015/158497
PCT Pub. Date: Oct. 22, 2015

(65) Prior Publication Data
US 2017/0025920 A1   Jan. 26, 2017

(30) Foreign Application Priority Data

Apr. 14, 2014 (BR) .................. 10 2014 009001.0

(51) Int. Cl.
*H02K 5/24* (2006.01)
*H02K 5/00* (2006.01)
(Continued)

(52) U.S. Cl.
CPC ............. *H02K 5/24* (2013.01); *F04D 25/06* (2013.01); *F04D 25/08* (2013.01); *F04D 29/664* (2013.01);
(Continued)

(58) Field of Classification Search
CPC .. H02K 5/00; H02K 5/24; F04D 25/06; F04D 25/08; F04D 29/664; F04D 29/668; F04D 29/4226; B30H 2001/006
(Continued)

(56) References Cited

U.S. PATENT DOCUMENTS 5,839,320 A    11/1998  Komachi
2003/0143919 A1  7/2003  Kaneko et al.
(Continued)

FOREIGN PATENT DOCUMENTS

EP    0713283 A2   5/1996

OTHER PUBLICATIONS

International Search Report issued in corresponding application No. PCT/EP2015/056009 dated Jan. 4, 2016 (3 pages).
(Continued)

*Primary Examiner* — Forrest M Phillips
(74) *Attorney, Agent, or Firm* — Osha Liang LLP

(57) ABSTRACT

The present invention relates to a fan motor support for HVAC systems of motor vehicles, comprising a two-part housing (15) having a second part (20) and a first part (20'), a flexible joint (30) connecting the first and second parts (20', 20), a plurality of internal ribs (40) arranged inside the first and second parts (20', 20) of the two-part housing (15), locking the motor radially, and at least one pair of projections (50) arranged inside the first and second parts (20', 20) of the two-part housing (15), locking the motor axially.

10 Claims, 5 Drawing Sheets

(51) Int. Cl.
*F04D 25/06* (2006.01)
*F04D 25/08* (2006.01)
*F04D 29/66* (2006.01)
*F04D 29/42* (2006.01)
*B60H 1/00* (2006.01)

(52) U.S. Cl.
CPC .............. *F04D 29/668* (2013.01); *H02K 5/00* (2013.01); *B60H 2001/006* (2013.01); *F04D 29/4226* (2013.01)

(58) Field of Classification Search
USPC .......................................................... 310/91
See application file for complete search history.

(56) References Cited

U.S. PATENT DOCUMENTS

| 2008/0265695 | A1* | 10/2008 | Yoshida | H02K 5/20 310/50 |
| 2011/0273038 | A1* | 11/2011 | Naman | F04D 25/082 310/58 |
| 2012/0074802 | A1* | 3/2012 | Oi | F04D 25/08 310/64 |
| 2012/0313466 | A1* | 12/2012 | Eisert | F04D 25/082 310/62 |
| 2013/0082550 | A1* | 4/2013 | Fleming | H02K 9/06 310/63 |
| 2013/0221786 | A1* | 8/2013 | Truillet | F04D 25/08 310/91 |
| 2015/0015103 | A1* | 1/2015 | Isoda | B60K 11/06 310/71 |
| 2016/0036289 | A1* | 2/2016 | Kawata | H02K 11/20 180/446 |

OTHER PUBLICATIONS

Written Opinion of the International Searching Authority issued in corresponding application No. PCT/EP2015/056009 dated Jan. 4, 2016 (7 pages).

* cited by examiner

FAN MOTOR SUPPORT

TECHNICAL FIELD

The present invention relates to a fan motor support and more particularly to a fan motor support for ventilation, heating and/or air-conditioning (HVAC) systems of motor vehicles.

BACKGROUND OF THE INVENTION

Fan motor supports are used to isolate vibration, to absorb impacts and to withstand motor load and have to be extremely durable and heat-resistant. Furthermore, they have to be simple to manufacture and to assemble.

Fan motor supports of HVAC systems are currently overmoulded, with specific detachment parts, which requires a number of tools for the construction and assembly thereof and there is also an inherent limitation on the assembly process thereof owing to the design of such motor supports.

SUMMARY OF THE INVENTION

The present invention relates to a fan motor support comprising a housing designed as two divided parts injection-moulded as a single piece, which eliminates the need for any cover and provides greater flexibility in terms of mounting any type of motor, including motors in which the brushes are larger than the motor diameter.

An object of the present invention is to provide a fan motor support that has a format that can be adapted to any type of motor.

A further object of the present invention is to provide a fan motor support that includes internal ribs that assist in the fitting thereof to any type of motor.

A yet further object of the present invention is to provide a fan motor support with holes for receiving electrical connectors of the motor.

An additional object of the present invention is to provide a fan motor support that can be fitted to the HVAC system of the motor vehicle.

The objects of the present invention are achieved by means of the provision of a fan motor support comprising a two-part housing having a second part and a first part, a flexible joint connecting the first and second parts, a plurality of internal ribs arranged inside the first and second parts of the two-part housing, locking the motor radially, and at least one pair of projections arranged inside the first and second parts of the two-part housing, locking the motor axially.

The objects of the present invention are additionally achieved by means of the provision of said support comprising, in addition, clips for attaching the second part of the housing to the first part thereof.

In addition, the objects of the present invention are achieved by means of the provision of the support in which the first and second parts may additionally be attached by means of screws or rivets.

Furthermore, the objects of the present invention are achieved by means of the provision of a support in which the number, format and thickness of the internal ribs thereof are determined by the type of motor housed in the fan motor support and by the level of vibration and noise absorption to be obtained.

Moreover, the objects of the present invention are achieved by means of the provision of a support in which the second part has a channel that extends over the perimeter of the edge thereof and receives a sealing means; and the first part further has a projection that likewise extends over the perimeter of the edge thereof and which has a profile that complements that of the channel in the second part, enclosing the seal.

The objects of the present invention are likewise achieved by means of the provision of the support to be fastened to the HVAC system by means of screws, wherein tabs with holes are provided in the external part of the housing of the support and the receiving part is provided on the HVAC system; or, furthermore, the support may be fastened to the HVAC system by rotation, wherein a tab provided in the external part of the housing is fitted into a recess provided in the HVAC system.

In yet a further possible embodiment, the objects of the present invention are achieved by means of the provision of the support in which the housing has holes for electrical connection of the motor.

In addition, the objects of the present invention may be achieved by means of the provision of a support in which shock-absorbing elements are provided at the ends of the internal ribs.

Lastly, the objects of the present invention are achieved by means of the provision of the support additionally comprising an additional sealing means formed by a channel located in the second part of the housing and by a projection located in the first part of the housing.

BRIEF DESCRIPTION OF THE DRAWINGS

The present invention will be better understood on the basis of the following detailed description taken in conjunction with the appended drawings, in which.

DETAILED DESCRIPTION OF THE INVENTION

Figure 1:
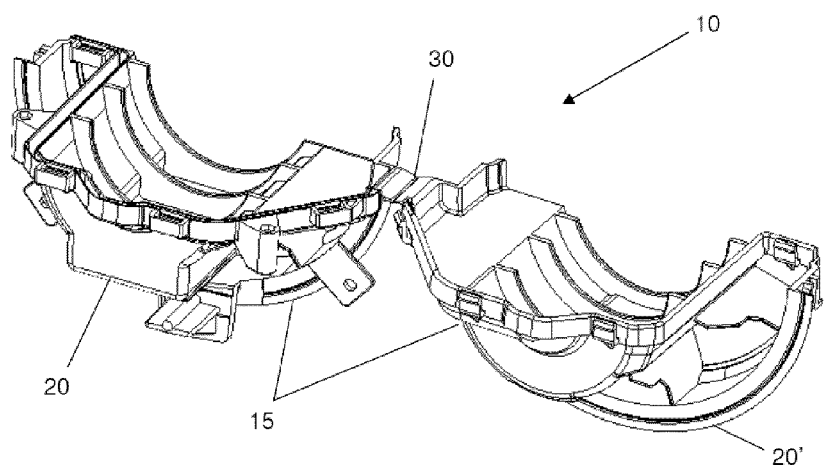
FIG. 1 is a perspective view of the fan motor support of the present invention, in the open state.
Figure 2A:
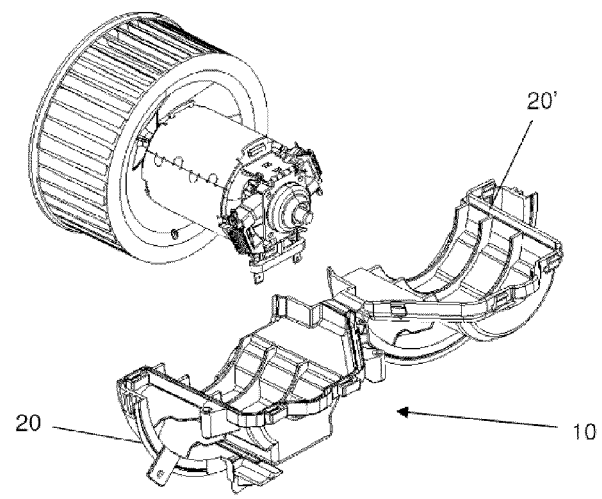
FIGS. 2A and 2B are perspective views of the fan motor support of the present invention with the fan motor already housed therein.
Figure 2B:
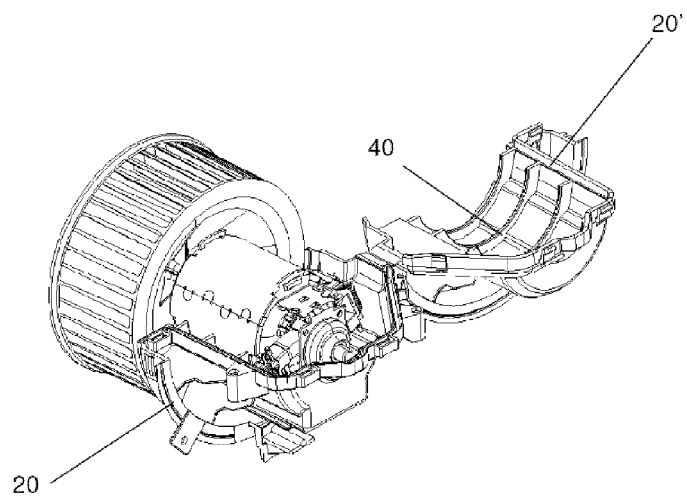

FIG. 1 illustrates the fan motor support 10 of the present invention, which comprises a two-part housing 15 having a first part 20' and a second part 20 connected by a flexible joint 30. FIGS. 2A and 2B illustrate the fan motor housed inside the support 10, resting on the second part 20. Subsequently, the support is closed with the first part 20' enclosing same, by means of bending of the flexible joint 30.

Internally, the first and second parts 20', 20 of the housing 15 have internal ribs 40 which act as locking devices in the radial direction, thereby preventing the fan motor from moving or vibrating in the radial direction thereof. The structural characteristics of the internal ribs 40, such as number, format and thickness, inter alia, will depend on the type of motor housed in the fan motor support 10. By way of example, a cylindrical motor casing will require internal ribs 40 of concave format. The thickness and the number of such ribs will depend on the weight of the motor overall and also on the level of vibration and noise absorption to be obtained.

Figure 4:
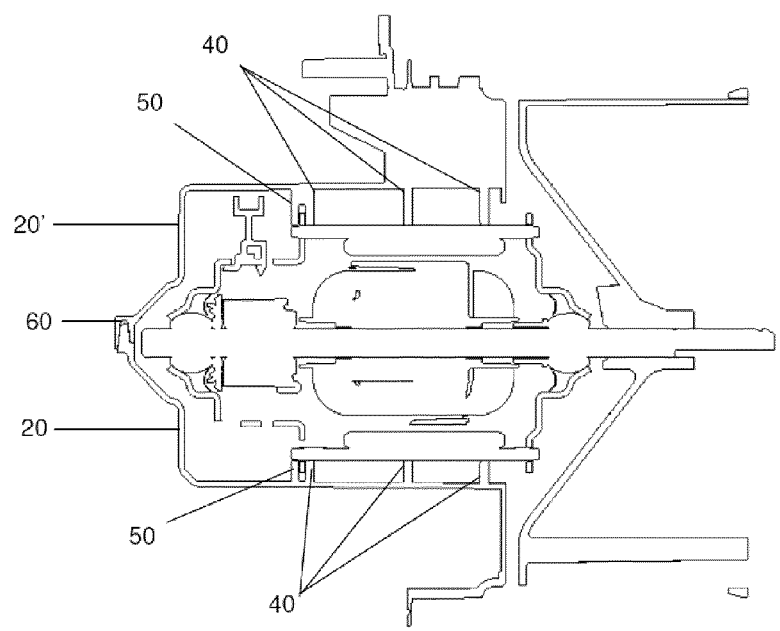
FIG. 4 is a view in cross section of the fan motor support of the present invention.

Furthermore, internally, as may be seen in FIG. 4, the first and second parts 20', 20 additionally have at least one pair of projections 50 acting as locking devices in the axial direction, preventing the motor from sliding in the direction of the axis thereof or turning inside the support.

Figure 5:
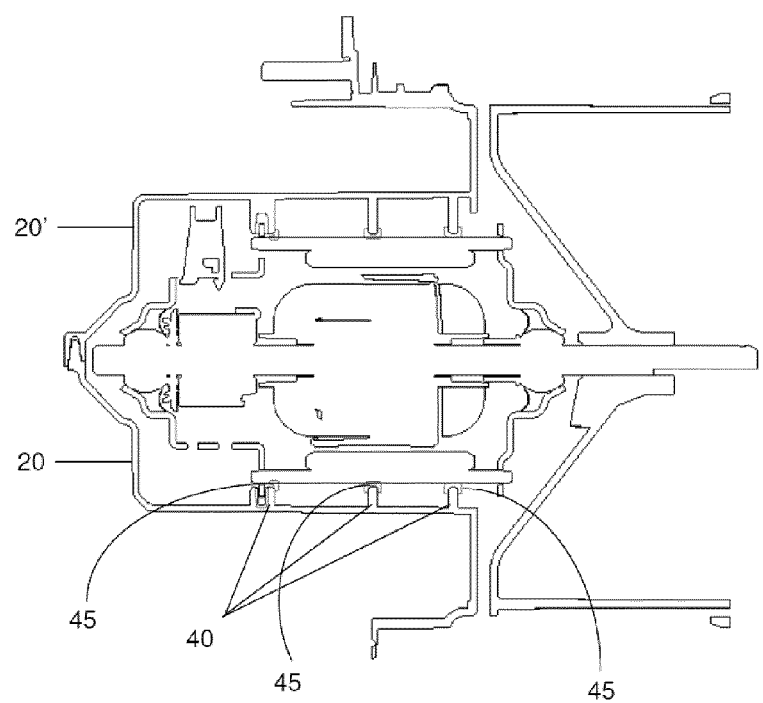
FIG. 5 is an additional view in cross section of the fan motor support of the present invention.

Alternatively, as illustrated in FIG. 5, shock-absorbing elements 45 may be provided at the ends of the internal ribs 40, which helps to prevent the fan motor from moving or vibrating in the radial direction thereof and also contributes to the absorption of vibration and noise.

Just like the internal ribs 40, the structural characteristics of the shock-absorbing elements 45, such as number, format and thickness, inter alia, will depend on the type of motor housed in the fan motor support and also on the level of vibration and noise absorption to be obtained.

Figures 3A, 3B:
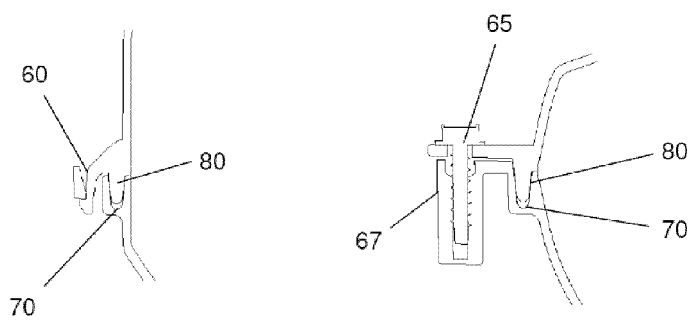
FIGS. 3A and 3B are schematic views of the closure devices of the fan motor support of the present invention.

As may be seen in FIG. 3A, the second part 20 of the support is attached to the first part 20' by means of clips 60. The clips may be of the type that have a male part arranged on one of the first and second parts 20', 20 and a female part arranged on the other of the first and second parts 20', 20. Alternatively or additionally, said attachment may also be provided by means of screws or rivets, inter alia, as illustrated in FIG. 3B, in which the first part 20' has a hole 65 and the second part 20 has a receiving part 67 that receives the screw or rivet.

In addition, the second part 20 has a channel 70 that extends over the perimeter of the edge thereof and receives a sealing means (not shown). Said sealing means is responsible for preventing the undesirable egress or ingress of air from or into the housing of the support of the present invention. The first part 20' further has a projection 80 that likewise extends over the perimeter of the edge thereof and which has a profile that complements that of the channel 70 in the second part 20 in order thus to complete the seal.

Figure 6:
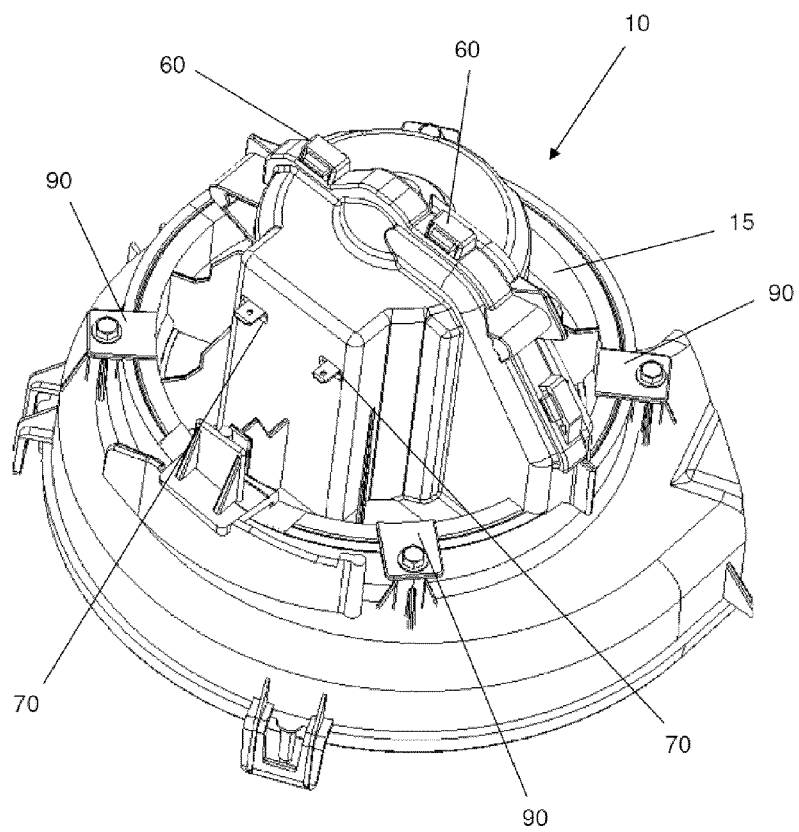
FIG. 6 is a perspective view of the fan motor support of the present invention, illustrating the fastening devices thereof.

After the housing of the support has been enclosed, the support 10 is then fastened to the HVAC system, as may be seen from FIG. 6. Said fastening may be achieved in a variety of ways. By way of example, fastening may be by means of screws, in which tabs 90 with holes are provided in the external part of the housing 15 of the support, whilst the receiving part is provided in the HVAC system; or, further, by rotation, wherein a tab provided on the external part of the housing of the support 10 is fitted into a recess provided in the HVAC system by turning the support 10 in the direction of said recess.

As further illustrated in FIG. 6, the housing has holes 70 for electrical connection of the motor. The configuration and position of said hole depends on the position of the connector of the motor received in the housing 15 of the support 10.

It should be noted that variations, modifications and alterations in the invention described herein are possible for those skilled in the art without thereby departing from the spirit and scope of the present invention or equivalents thereto, which are encompassed within the appended claims and equivalents thereof.

The invention claimed is:

1. A fan motor support for HVAC systems of motor vehicles, the support comprising:
   a two-part housing having a first part and a second part;
   a flexible joint connecting the first and second parts;
   a plurality of internal ribs arranged inside the first and second parts of the two-part housing, locking the motor radially; and
   at least one pair of projections arranged inside the first and second parts of the two-part housing, locking the motor axially.

2. The support according to claim 1, further comprising clips for attaching the second part of the housing to the first part thereof.

3. The support according to claim 2, wherein the first and second parts may additionally be attached by one of screws or rivets.

4. The support according to claim 1, wherein the number, format and thickness of the internal ribs are determined by a type of motor housed in the fan motor support, and by the level of vibration and noise absorption to be obtained.

5. The support according to claim 1, wherein:
   the second part has a channel that extends over the perimeter of the edge thereof and receives a sealing means; and
   the first part further has a projection that likewise extends over the perimeter of the edge thereof and which has a profile that complements that of the channel in the second part, enclosing the seal.

6. The support according to claim 1, wherein the support is fastened to the HVAC system by means of screws, wherein tabs with holes are provided in the external part of the housing of the support and the receiving part is provided in the HVAC system.

7. The support according to claim 1, wherein the support is fastened to the HVAC system by rotation, and wherein a tab provided in the external part of the housing is fitted into a recess provided in the HVAC system.

8. The support according to claim 1, wherein the housing has holes for electrical connection of the motor.

9. The support according to claim 1, wherein shock-absorbing elements are provided at the ends of the internal ribs.

10. The support according to claim 1, further comprising an additional sealing means formed by a channel located in the second part of the housing and by a projection located in the first part of the housing.

* * * * *